US012304095B2

(12) United States Patent
Trichter et al.

(10) Patent No.: US 12,304,095 B2
(45) Date of Patent: *May 20, 2025

(54) SHAVING IMPLEMENT

(71) Applicants: Jonathan Abraham Trichter, New York, NY (US); Jesus J. Valle, New York, NY (US)

(72) Inventors: Jonathan Abraham Trichter, New York, NY (US); Jesus J. Valle, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,417

(22) Filed: Nov. 15, 2023

(65) Prior Publication Data

US 2024/0083057 A1 Mar. 14, 2024

Related U.S. Application Data

(63) Continuation of application No. 18/071,509, filed on Nov. 29, 2022, now Pat. No. 11,858,157.

(60) Provisional application No. 63/296,300, filed on Jan. 4, 2022.

(51) Int. Cl.

| | |
|---|---|
| ***B26B 21/56*** | (2006.01) |
| ***B26B 21/20*** | (2006.01) |
| ***B26B 21/40*** | (2006.01) |
| ***B26B 21/52*** | (2006.01) |

(52) U.S. Cl.

CPC ............ *B26B 21/565* (2013.01); *B26B 21/20* (2013.01); *B26B 21/522* (2013.01); *B26B 21/525* (2013.01); *B26B 21/4043* (2013.01)

(58) Field of Classification Search

CPC ..... B26B 21/565; B26B 21/20; B26B 21/522; B26B 21/525; B26B 21/4043

See application file for complete search history.

(56) References Cited

U.S. PATENT DOCUMENTS 2,017,359 A * 10/1935 Thessing .............. B24D 15/105 30/334
2,513,663 A * 7/1950 Mcdaniel ................. A01D 1/04 30/356
2,587,336 A * 2/1952 Larson ..................... A01D 1/04 30/309

(Continued)

FOREIGN PATENT DOCUMENTS

CN 101318335 A * 12/2008

*Primary Examiner* — Jonathan G Riley

(74) *Attorney, Agent, or Firm* — Dhiraj Jindal; PATENT YOGI LLC

(57) ABSTRACT

A shaving implement comprises a cutting portion and an end portion. Further, the cutting portion transitions between a straight configuration and a bent configuration based on an application of an external force on the cutting portion. forming a bend in the cutting portion characterized by a curvature and a direction. Further, transitioning the cutting portion from the configuration to the straight configuration comprises removing the bend. Further, the cutting portion is not transitionable between the straight configuration and the bent configuration without the application of the external force. Further, the cutting portion comprises a blade slot for receiving a blade. Further, the cutting portion curves the blade in a blade shape based on the forming of the bend. Further, the end portion removably holds the cutting portion.

19 Claims, 10 Drawing Sheets

(56) References Cited

U.S. PATENT DOCUMENTS

| | | | | | |
|---|---|---|---|---|---|
| 2,991,553 | A * | 7/1961 | Levine | B26B 21/00 | 30/356 |
| 4,487,211 | A * | 12/1984 | Sullivan | B26B 13/24 | 132/213.1 |
| 4,665,615 | A * | 5/1987 | Martinez | B26B 21/10 | 30/53 |
| 4,845,848 | A * | 7/1989 | Strickland | B26B 21/52 | 30/32 |
| 4,860,452 | A * | 8/1989 | Guarnaccia | B26B 21/56 | 30/346.5 |
| 4,893,641 | A * | 1/1990 | Strickland | B26B 21/28 | 30/41 |
| 4,916,816 | A * | 4/1990 | Richman | B26B 5/006 | 30/49 |
| 4,920,644 | A * | 5/1990 | LaGattuta | B26B 21/10 | 30/53 |
| 4,955,136 | A * | 9/1990 | Diaz-Rivera | B26B 21/522 | 30/32 |
| 5,979,056 | A * | 11/1999 | Andrews | B26B 21/22 | 30/356 |
| 6,094,820 | A * | 8/2000 | Adachi | B26B 21/12 | 30/30 |
| 9,168,661 | B1 * | 10/2015 | Ho | B26B 21/12 | |
| 2002/0189105 | A1 * | 12/2002 | Kitano | B26B 21/10 | 30/53 |
| 2003/0154603 | A1 * | 8/2003 | Guimont | B26B 21/44 | 30/34.05 |
| 2004/0168752 | A1 * | 9/2004 | Julien | C22F 1/006 | 148/563 |
| 2016/0158951 | A1 * | 6/2016 | Gers-Barlag | B26B 21/522 | 30/34.05 |
| 2017/0190065 | A1 * | 7/2017 | Pound | B26B 21/522 | |

* cited by examiner

SHAVING IMPLEMENT

CROSS-REFERENCE TO RELATED APPLICATION

This application claims the benefit of U.S. Provisional Patent Application No. 63/296,300, titled "A MALLEABLE RAZOR IMPLEMENT WITH A BENDABLE RAZOR HOLDER", filed 4 Jan. 2022, which is incorporated by reference herein in its entirety.

This application is a continuation of U.S. patent application Ser. No. 18/071,509, titled "A SHAVING IMPLEMENT", filed Nov. 11, 2022, which is incorporated by reference herein in its entirety.

FIELD OF THE INVENTION

Generally, the present disclosure relates to the field of washing, cleaning, or drying machine. More specifically, the present disclosure relates to a shaving implement.

BACKGROUND OF THE INVENTION

Today's standard men's disposable razor designs include some small and straight blades that are mated to a straight-line implement that drags across one's face. The straight-line implement makes it difficult to reach certain parts of the face, such as nooks and crannies under one's nose or around one's lips. It also makes it hard to sculpt a natural curve around a mustache or goatee beard. And it is impossible to shave a dimple on one's chin with these fixed blades. Also, current razors that have straight blades do not allow men to connect to hard-to-reach areas of the face efficiently, which would cut down on the number of strokes required to shave across one's face in hard-to-reach areas. Instead, current razor designs require a larger number of passes across hard-to-reach areas of one's face, which can become sensitive. Face irritation and razor burn correlate with the number of strokes required for clean shaving of any area. Using the current razor to perform a close shave in hard-to-reach sensitive areas requires more passes and leads to more irritation and razor burn. As a result, a razor with blades that are malleable and manipulatable for adjusting its curve to an irregular surface area is an advancement in shaving efficiency and capacity.

Therefore, there is a need for an improved shaving implement that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a shaving implement, in accordance with some embodiments. Accordingly, the shaving implement may include a cutting portion and an end portion. Further, the cutting portion may include a first end and a second end opposite to the first end. Further, the cutting portion may be configured to be transitioned between a straight configuration and at least one bent configuration based on an application of at least one external force on the cutting portion. Further, transitioning the cutting portion from the straight configuration to the at least one bent configuration may include forming at least one bend in the cutting portion along a length of the cutting portion defined between the first end and the second end. Further, the at least one bend may be characterized by at least one of a curvature and a direction of the at least one bend. Further, transitioning the cutting portion from the at least one bent configuration to the straight configuration may include removing the at least one bend from the cutting portion. Further, the cutting portion may be not transitionable between the straight configuration and the at least one bent configuration without the application of the at least one external force. Further, the cutting portion may include at least one blade slot configured for receiving at least one blade in the at least one blade slot. Further, the cutting portion may be configured for securing the at least one blade in the at least one blade slot. Further, a cutting edge of each of the at least one blade protrudes from a first side end of the cutting portion. Further, the first side end may be adjacent to the first end and the second end. Further, the cutting portion curves the at least one blade in at least one blade shape for conforming the at least one blade to the at least one bend based on the forming of the at least one bend. Further, the end portion may be configured for removably holding the cutting portion. Further, the second end may be attached to the end portion for the removably holding of the cutting portion.

Further disclosed herein is a shaving implement, in accordance with some embodiments. Accordingly, the shaving implement may include a cutting portion, an end portion, and a handle. Further, the cutting portion may include a first end and a second end opposite to the first end. Further, the cutting portion may be configured to be transitioned between a straight configuration and at least one bent configuration based on an application of at least one external force on the cutting portion. Further, transitioning the cutting portion from the straight configuration to the at least one bent configuration may include forming at least one bend in the cutting portion along a length of the cutting portion defined between the first end and the second end. Further, the at least one bend may be characterized by at least one of a curvature and a direction of the at least one bend. Further, transitioning the cutting portion from the at least one bent configuration to the straight configuration may include removing the at least one bend from the cutting portion. Further, the cutting portion may be not transitionable between the straight configuration and the at least one bent configuration without the application of the at least one external force. Further, the cutting portion may include at least one blade slot configured for receiving at least one blade in the at least one blade slot. Further, the cutting portion may be configured for securing the at least one blade in the at least one blade slot. Further, a cutting edge of each of the at least one blade protrudes from a first side end of the cutting portion. Further, the first side end may be adjacent to the first end and the second end. Further, the cutting portion curves the at least one blade in at least one blade shape for conforming the at least one blade to the at least one bend based on the forming of the at least one bend. Further, the end portion may be configured for removably holding the cutting portion. Further, the second end may be attached to the end portion for the removably holding of the cutting portion. Further, the handle may be extending between a first handle end and a second handle end. Further, the end portion may be configured to be coupled with the handle at the second handle end for attaching the handle to the cutting portion.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
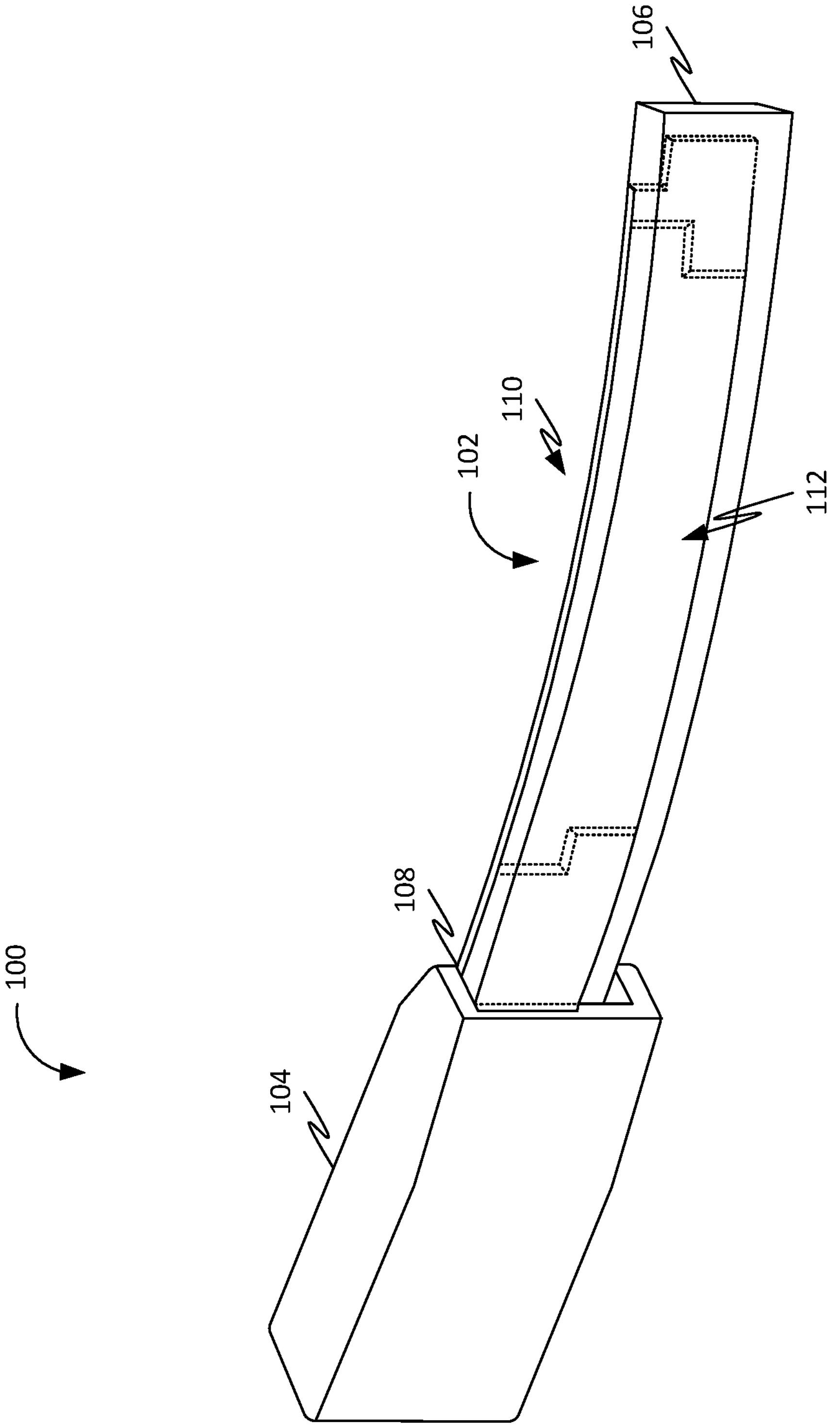
FIG. 1 is a perspective view of a shaving implement, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a shaving implement, embodiments of the present disclosure are not limited to use only in this context.

Overview

The present disclosure describes a malleable razor implement with a bendable razor blade. Further, the malleable (or bendable) razor implement (or implement) with a bendable razor blade (or razor blade) may be mated to or inserted into the implement such that a user may bend the implement (or razor implement) at various angles in order to adjust the razor blade to different angles to fit the contours of one's face or beard or facial hair in various spots, particularly the hard-to-reach areas of a man's face under the nose, around the lips and the chin area or around the shape of one's facial hair to shape one's beard or mustache at precise angles/curves, etc. Further, the implement may be made of bendable material that holds its shape when bent. Further, the razor blade may be mated/molded/inserted inside the implement. The inserted razor blade is a thin commercially available disposable razor blade, which is thin enough to bend with and inside the implement, which will hold the razor blade in place as it is. Further, the razor blade may be reinforced by light glue or fixed by screws, or pressed by force to secure it in place. Further, the implement may be made of pliable and malleable material. Further, the razor blade may be bent inside the implement as the implement curvature and shape are manipulated and changed. Once the curve of the implement is bent in a new angle or curvature, the implement maintains that shape as does the razor blade inside it.

Further, the razor blade may be bent to match or mirror these difficult angles of one's face that may conform to irregular parts of one's face so that the blade can reach those parts cleanly. It could also be bent to help shape and sculpt one's beard and other facial hair. Even just as a secondary razor blade, men may complete a shave without missing the hard-to-reach areas and also use the blade to better shape facial hair at tight angles. Further, the razor blade may allow men to hit these hard-to-reach areas more efficiently and thereby cut down on the number of strokes required to shave across one's face at awkward angles in the hard-to-reach areas. Face irritation and razor burn correlate with the number of strokes required for clean shaving an area of the face. Further, the implement may significantly cut down on the number of passes these sensitive and hard-to-reach areas require for a close shave and well-sculpted facial hair.

Further, the malleable razor or bendable razor may be adjusted to the different angles of one's face in different parts of the face. Further, the razor implement may be fitted and bent by a shaver in real-time to fit different hard-to-reach spaces on one's face or to fit the curves of one's facial hair. Whereas conventional razors are straight, the disclosed malleable razor allows the shaver to curve the blade around the area under and around the nose, lips, and chin, and also around the mustache, goatee, mutton chops, etc. The result is a closer shave with less irritation and razor burn in sensitive areas of a man's face that are otherwise hard to shave closely or with precise angles. Further, the razor blade may be bent by the user to conform to the user's face.

Further, the razor blade may be mated/molded/inserted inside the implement. Further, the razor blade may be reinforced by light glue or fixed with screws or pressed to ensure it stays in place. Further, the implement may be made of pliable and malleable material. Like a long and inexpensive spoon at its neck that can bend, the implement may be bent back and forth (concave to convex). Further, the razor blade inside the implement may be thin and therefore weak enough to bend with the razor device.

Further, in some embodiments, the implement may be made up of malleable materials such as copper, silver, lead, aluminum, steel, tin, plastic, etc.

Further, the implement (shaving implement) may be configured for allowing insertably removal of replaceable blades in a cutting portion of the implement. The cutting portion may include a strip (plate) made of a solid material such as aluminum that can bend, and then there would be a strip (plate) made up of a more flexible material such as a silicone and attached to the strip made of metal. This implement may be able to hold the blade securely while also allowing the cutting portion to be curved. The end portion may interface with a handle and could even have a removable section that holds in the flexible cutting portion for allowing replacing of the cutting portion.

FIG. 1 is a perspective view of a shaving implement 100, in accordance with some embodiments. Further, the shaving implement 100 may be in at least one bent configuration. Further, the shaving implement 100 may include a cutting portion 102 and an end portion 104.

Figure 3:
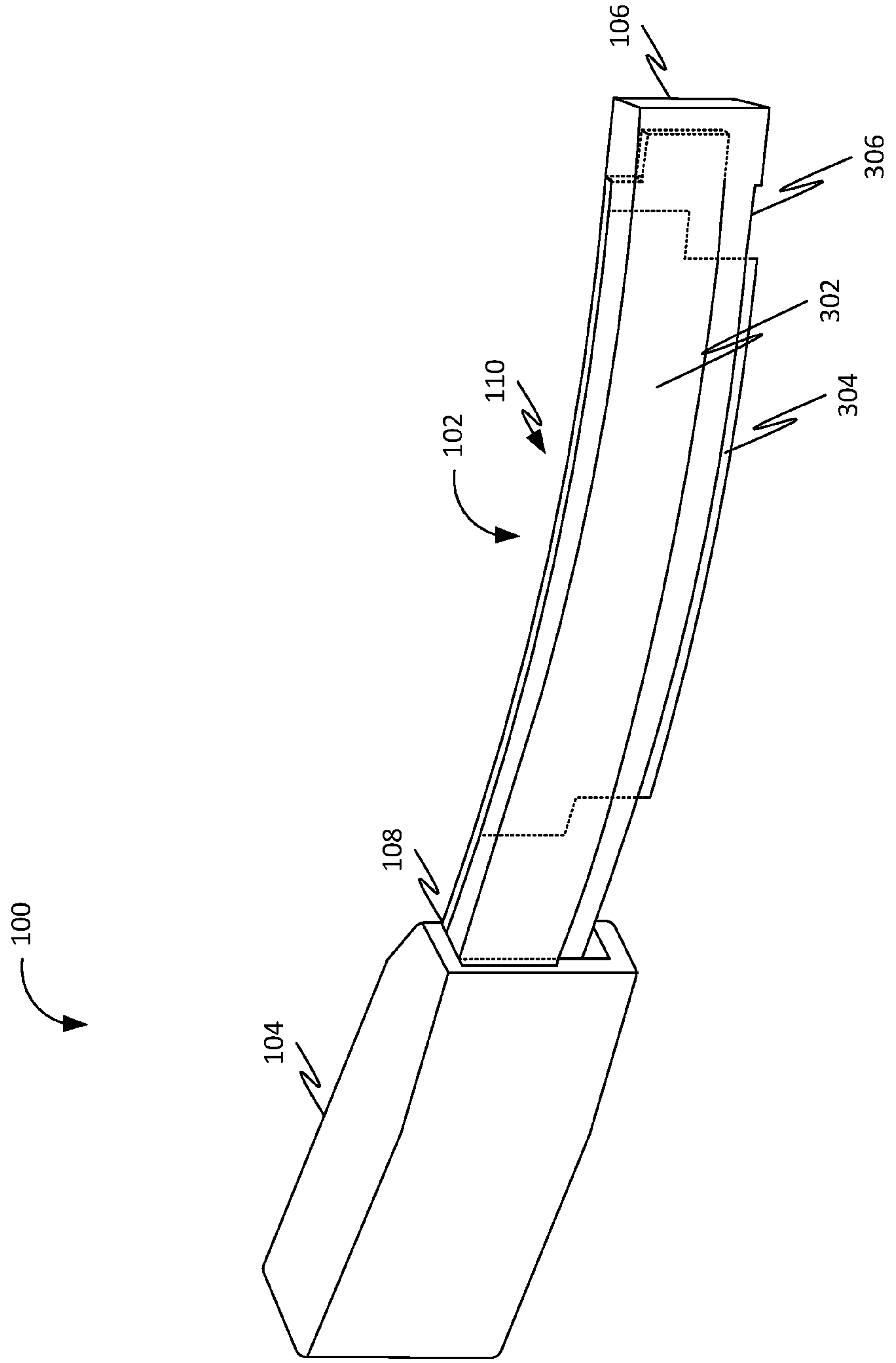
FIG. 3 is a perspective view of the shaving implement with the at least one blade, in accordance with some embodiments.

Further, the cutting portion 102 may include a first end 106 and a second end 108 opposite to the first end 106. Further, the cutting portion 102 may be configured to be transitioned between a straight configuration and the at least one bent configuration based on an application of at least one external force on the cutting portion 102. Further, the at least external force may include a manual force applied by a hand of a user on the cutting portion 102. Further, the cutting portion 102 transitions between the straight configuration and the at least one bent configuration based on the application of the at least one external force greater than a threshold force. Further, the cutting portion 102 does not transition between the straight configuration and the at least one bent configuration based on the application of the at least one external force less than the threshold force. Further, the threshold force may be based on at least one of an elasticity and a plasticity of a material of the cutting portion 102. Further, transitioning the cutting portion 102 from the straight configuration to the at least one bent configuration may include forming at least one bend 110 in the cutting portion 102 along a length of the cutting portion 102 defined between the first end 106 and the second end 108. Further, the length may be a longitudinal span of the cutting portion 102 from the first end 106 to the second end 108. Further, the forming of the at least one bend 110 may include curving the cutting portion 102. Further, the forming of the at least one bend 110 shapes the cutting portion 102 in at least one shape. Further, the at least one shape may include a C-shape, a U-shape, a W-shape, a S-shape, etc. Further, the at least one bend 110 may be characterized by at least one of a curvature and a direction of the at least one bend 110. Further, the direction of may be a position of the at least one bend 110 in relation to a plane parallel to the cutting portion 102 in the straight configuration. Further, the direction may include an outward direction, an inward direction, etc. Further, transitioning the cutting portion 102 from the at least one bent configuration to the straight configuration may include removing the at least one bend 110 from the cutting portion 102. Further, the removing of the at least one bend 110 from the cutting portion 102 may include straightening the cutting portion 102. Further, the cutting portion 102 may be not transitionable between the straight configuration and the at least one bent configuration without the application of the at least one external force. Further, not transitioning the cutting portion 102 may include retaining the at least one shape of the cutting portion 102 after a removal of the at least one external force from the cutting portion 102. Further, the cutting portion 102 may include at least one blade slot 112 configured for receiving at least one blade 302, as shown in FIG. 3, in the at least one blade slot 112. Further, the at least one blade slot 112 may be configured for replaceably receiving the at least one blade 302. Further, the cutting portion 102 may be configured for securing the at least one blade 302 in the at least one blade slot 112. Further, a cutting edge 304 of each of the at least one blade 302 protrudes from a first side end 306 of the cutting portion 102. Further, the first side end 306 may be adjacent to the first end 106 and the second end 108. Further, the cutting portion 102 curves the at least one blade 302 in at least one blade shape for conforming the at least one blade 302 to the at least one bend 110 based on the forming of the at least one bend 110.

Further, the end portion 104 may be configured for removably holding the cutting portion 102. Further, the second end 108 may be attached to the end portion 104 for the removably holding of the cutting portion 102. Further, the cutting portion 102 may be removably inserted in the end portion 104 for the holding of the cutting portion in the end portion 104

Further, in an embodiment, the at least one blade 302 may be comprised of at least one elastically deformable material. Further, the at least one elastically deformable material may include steel, copper, aluminum, ceramic, Iron-based alloys, etc. Further, in an embodiment, the at least one blade 302 may be comprised of at least one plastically deformable material. Further, the at least one plastically deformable material may include nitinol (an alloy of 49%-51% of nickel and titanium), cermet, polyaramid fiber (Kevlar), glass fiber, carbon fiber, etc. Further, the at least one blade 302 curved in the at least one blade shape reaches every part of a face of the user. Further, the at least one blade 302 curved in the at least one blade shape sculpts a natural curve corresponding to the at least one blade shape around a mustache or a goatee beard of the user. Further, the at least one blade 302 curved in the at least one blade shape shaves hair of a face of the user, a head of the user, etc., in at least one shape corresponding to the at least one blade shape. Further, the at least one blade shape of the at least one blade 302 may be manipulated by the user based on the application of the at least one external force on the cutting portion 102 to transition the cutting portion 104 to one of the at least one bent configuration which includes the forming of the at least one bend 110 in the cutting portion 102.

Further, in some embodiments, the cutting portion 102 may be comprised of at least one plastically deformable material. Further, the at least one plastically deformable material allows transitioning of the cutting portion 102 between the straight configuration and the at least one bent configuration based on the application of the at least one external force. Further, the at least one plastically deformable material does not allow the transitioning of the cutting portion 102 between the straight configuration and the at least one bent configuration without the application of the at least one external force. Further, the at least one plastically deformable material may include nitinol (an alloy of 49%-51% of nickel and titanium), cermet, polyaramid fiber (Kevlar), glass fiber, carbon fiber, etc. Further, in some embodiments, the cutting portion 102 may be comprised of at least one material. Further, the at least one material may be pliable and malleable. Further, the at least one material allows transitioning of the cutting portion 102 between the straight configuration and the at least one bent configuration based on the application of the at least one external force.

Further, in some embodiments, the cutting portion 102 may be configured for removably securing the at least one blade 302 in the at least one blade slot 112.

Figure 2:
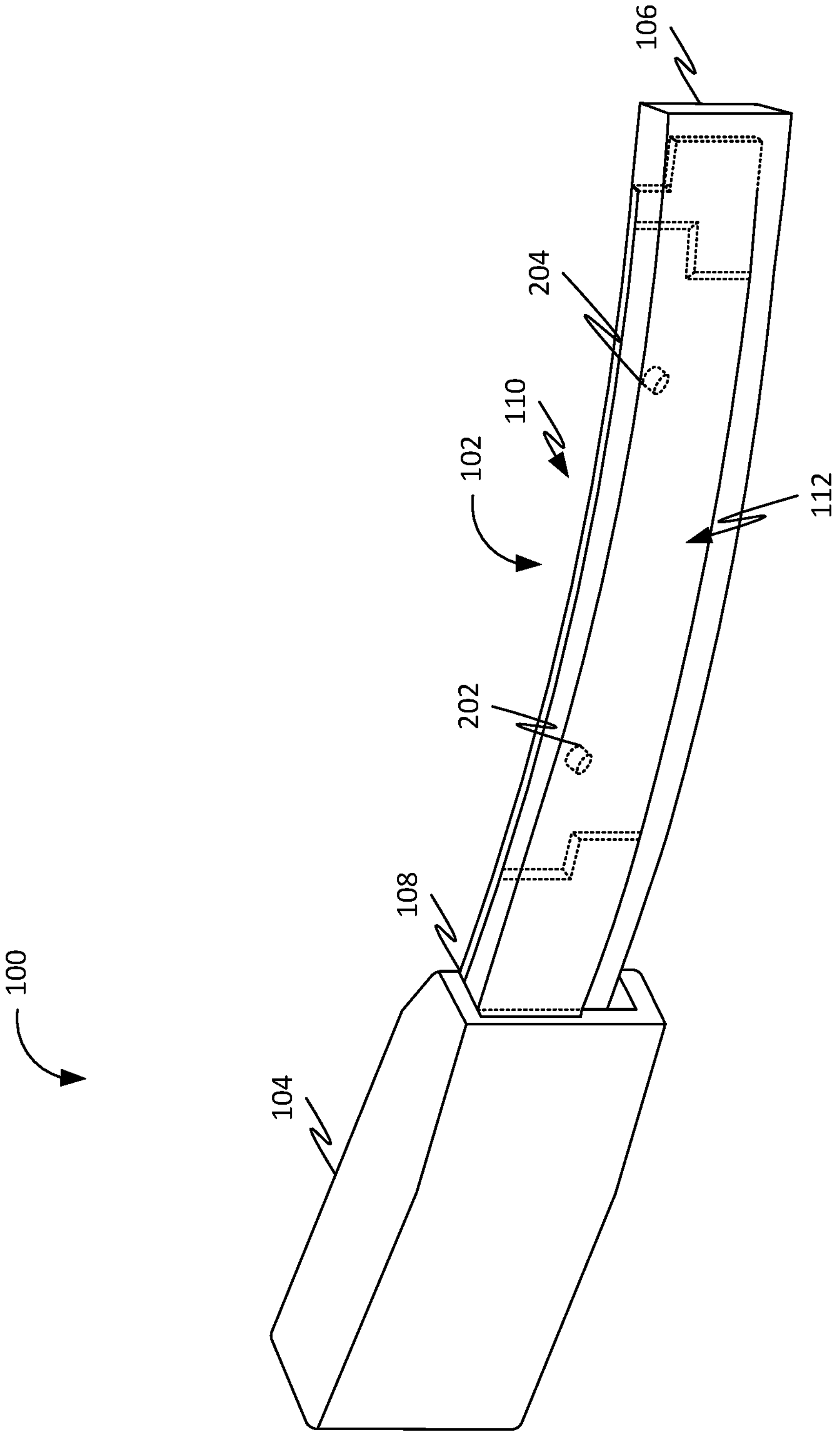
FIG. 2 is a perspective view of the shaving implement, in accordance with some embodiments.

Further, in some embodiments, the cutting portion 102 may be configured for removably securing the at least one blade 302 in the at least one blade slot 112 using at least one securing element 202-204, as shown in FIG. 2. Further, the at least one securing element 202-204 may include screws, bolts and nuts, permanent magnets, etc.

Further, in some embodiments, the cutting portion 102 may be configured for receiving the at least one blade 302 in at least one of a plurality of locations of the at least one blade slot 112 along a length of the at least one blade slot 112.

Further, in an embodiment, the cutting portion 102 may be configured for movably receiving the at least one blade 302 in the at least one blade slot 112. Further, the at least one blade 302 moves between the plurality of locations along the length of the at least one blade slot 112 cutting portion 102 in the straight configuration based on the movably receiving.

Further, in some embodiments, the at least one blade slot 112 may include a plurality of blade slots spacedly disposed on the cutting portion 102. Further, the at least one blade 302 may include a plurality of blades. Further, the plurality of blade slots receives the plurality of blades.

Further, in some embodiments, the at least one bend 110 may include a plurality of bends. Further, the forming of the at least one bend 110 in the cutting portion 102 along the cutting portion 102 may include forming the plurality of bends in the cutting portion 102 along the cutting portion 102.

Further, in some embodiments, the forming of the at least one bend 110 in the cutting portion 102 along the cutting portion 102 may include forming the at least one bend 110 in at least one location of the cutting portion 102 along the cutting portion 102.

Figure 4:
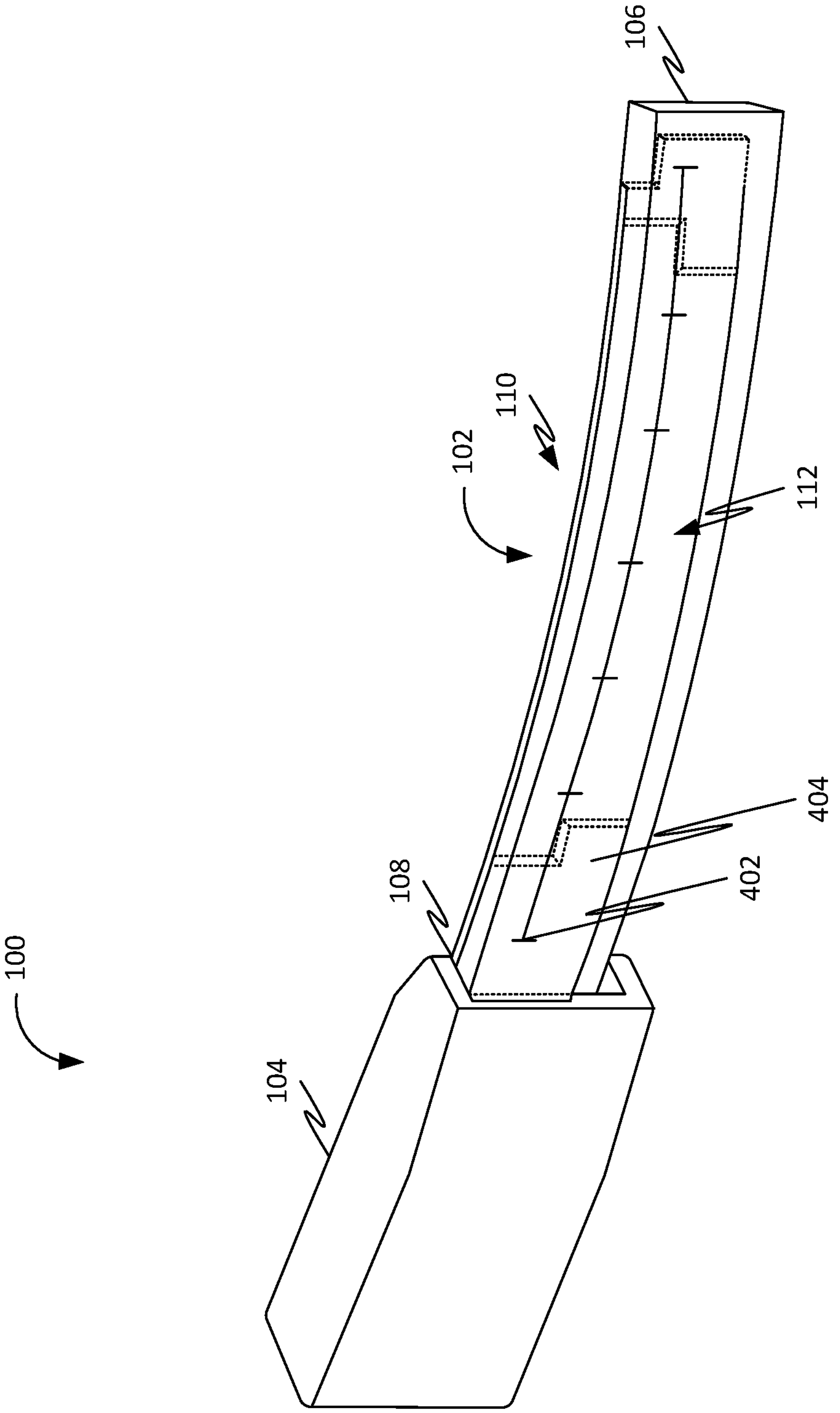
FIG. 4 is a perspective view of the shaving implement, in accordance with some embodiments.

Further, in an embodiment, the cutting portion 102 may include at least one marking 402, as shown in FIG. 4, on a surface 404 of the cutting portion 102. Further, the at least one marking 404 marks the at least one location. Further, the at least one marking 402 indicates a plurality of segments of the cutting portion 102 along the length.

Further, in some embodiments, the at least one blade 302 may be characterized by a blade length. Further, the length of the at least one blade 302 may be less than a length of the at least one blade slot 112.

Further, in some embodiments, the at least one blade 302 may be characterized by a blade length. Further, the length of the at least one blade 302 may be greater than a length of the at least one blade slot 112.

Further, in some embodiments, the at least one blade 302 may be characterized by a blade length. Further, the length of the at least one blade 302 may be equal to a length of the at least one blade slot 112.

Figure 5:
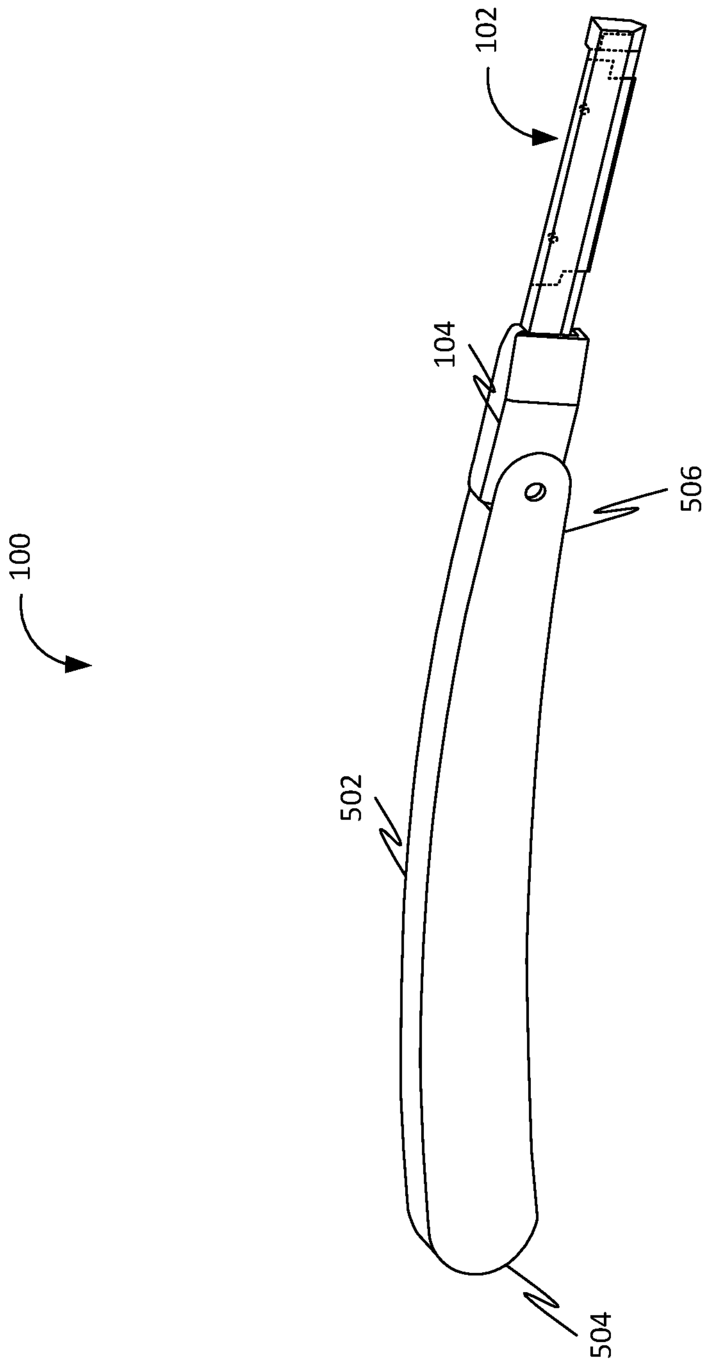
FIG. 5 is a perspective view of the shaving implement with the handle, in accordance with some embodiments.

In further embodiments, the shaving implement 100 may include a handle 502 between a first handle end 504 and a second handle end 506, as shown in FIG. 5. Further, the end portion 104 may be configured to be coupled with the handle 502 at the second handle end 506 for attaching the handle 502 to the cutting portion 102. Further, the user grips the handle 502 with a hand of the user for using the shaving implement 100. Further, the handle 502 may be pivotally coupled with the end portion 104.

Figure 6:
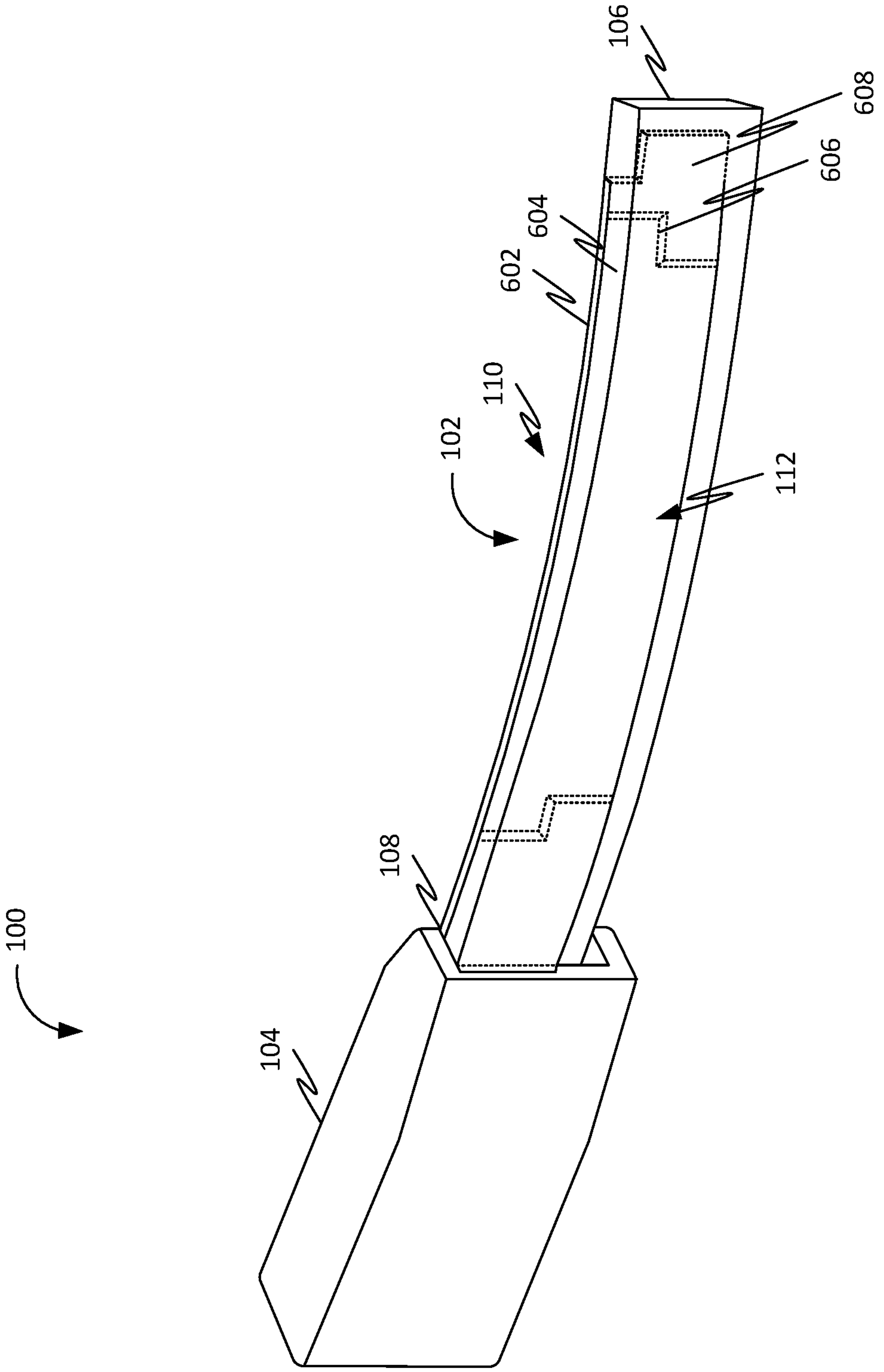
FIG. 6 is a perspective view of the shaving implement, in accordance with some embodiments.

Further, in some embodiments, the cutting portion 102 may include an elongated first plate 602 and an elongated second plate 604, as shown in FIG. 6. Further, the elongated first plate 602 may include at least one groove 606 on a first surface 608 of the elongated first plate 602. Further, the elongated second plate 604 may be attached to the first surface 608 of the elongated first plate 602 over the at least one groove 606 for forming the at least one blade slot 112. Further, the at least one groove 606 may be blade shaped.

Further, in an embodiment, the elongated first plate 602 may include a plastically deformable material and the elongated second plate 604 may include a flexible material. Further, the plastically deformable material may include metals such as aluminum, copper, silver, etc. Further, the flexible material may include silicone, elastomer, etc.

Further, in an embodiment, the elongated second plate 604 may be comprised of a flexible material. Further, the flexible material may include polytetrafluoroethylene, acrylic or polymethyl methacrylate (PMMA), etc.

Further, in an embodiment, the elongated second plate 604 interfaces with the at least one blade 302 present in the at least one blade slot 112. Further, the elongated second plate 604 frictionally resists at least one movement of the at least one blade 302 in relation to the at least one blade slot 112 based on the interfacing of the elongated second plate 604 with the at least one blade 302 for the securing of the at least one blade 302 in the at least one blade slot 112.

FIG. 2 is a perspective view of the shaving implement 100, in accordance with some embodiments.

FIG. 3 is a perspective view of the shaving implement 100 with the at least one blade 302, in accordance with some embodiments.

FIG. 4 is a perspective view of the shaving implement 100, in accordance with some embodiments.

FIG. 5 is a perspective view of the shaving implement 100 with the handle 502, in accordance with some embodiments.

FIG. 6 is a perspective view of the shaving implement 100, in accordance with some embodiments.

Figure 7:
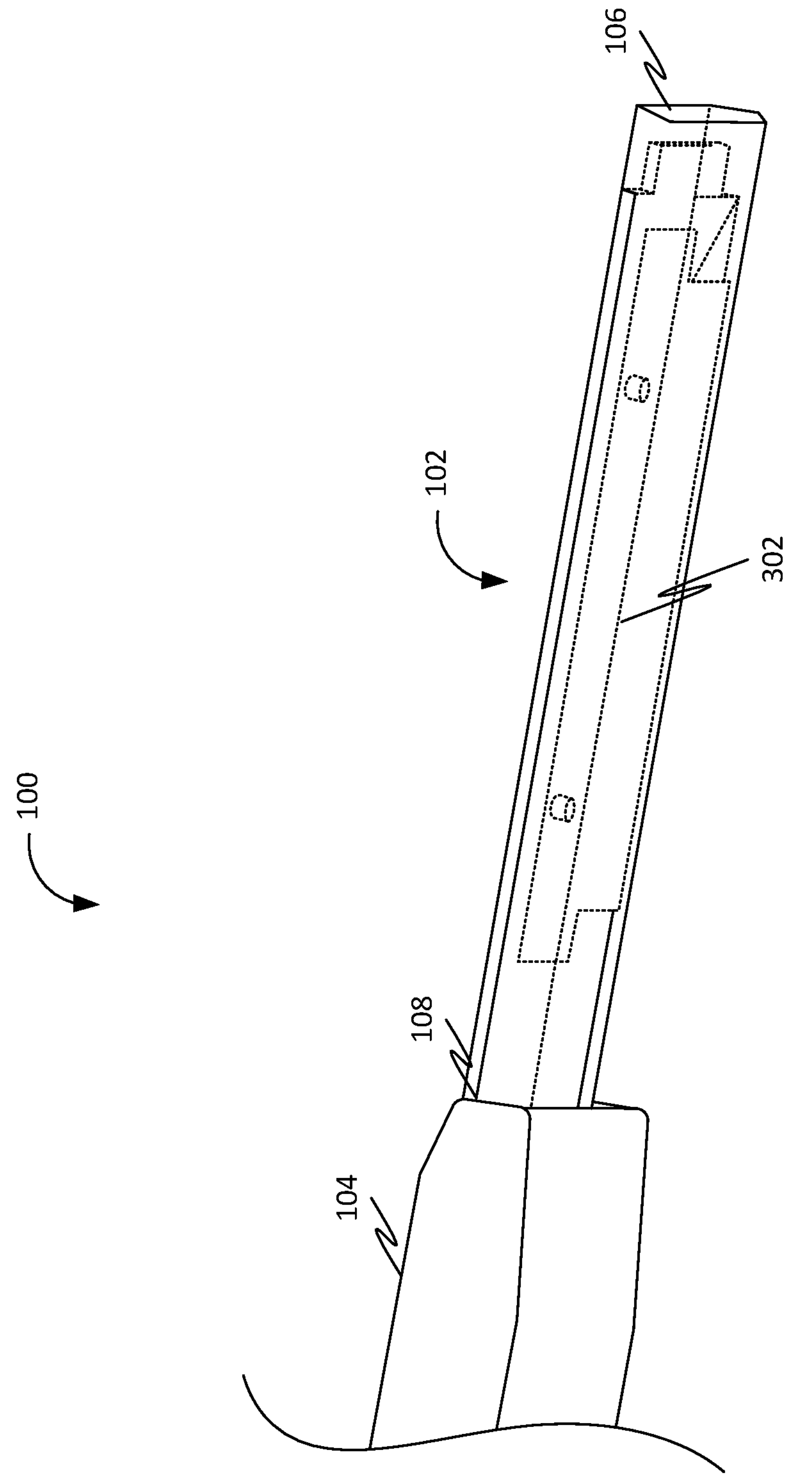
FIG. 7 is a perspective partial view of the shaving implement, in accordance with some embodiments.

FIG. 7 is a perspective partial view of the shaving implement 100, in accordance with some embodiments. Further, the shaving implement 100 may be in the straight configuration.

Figure 8:
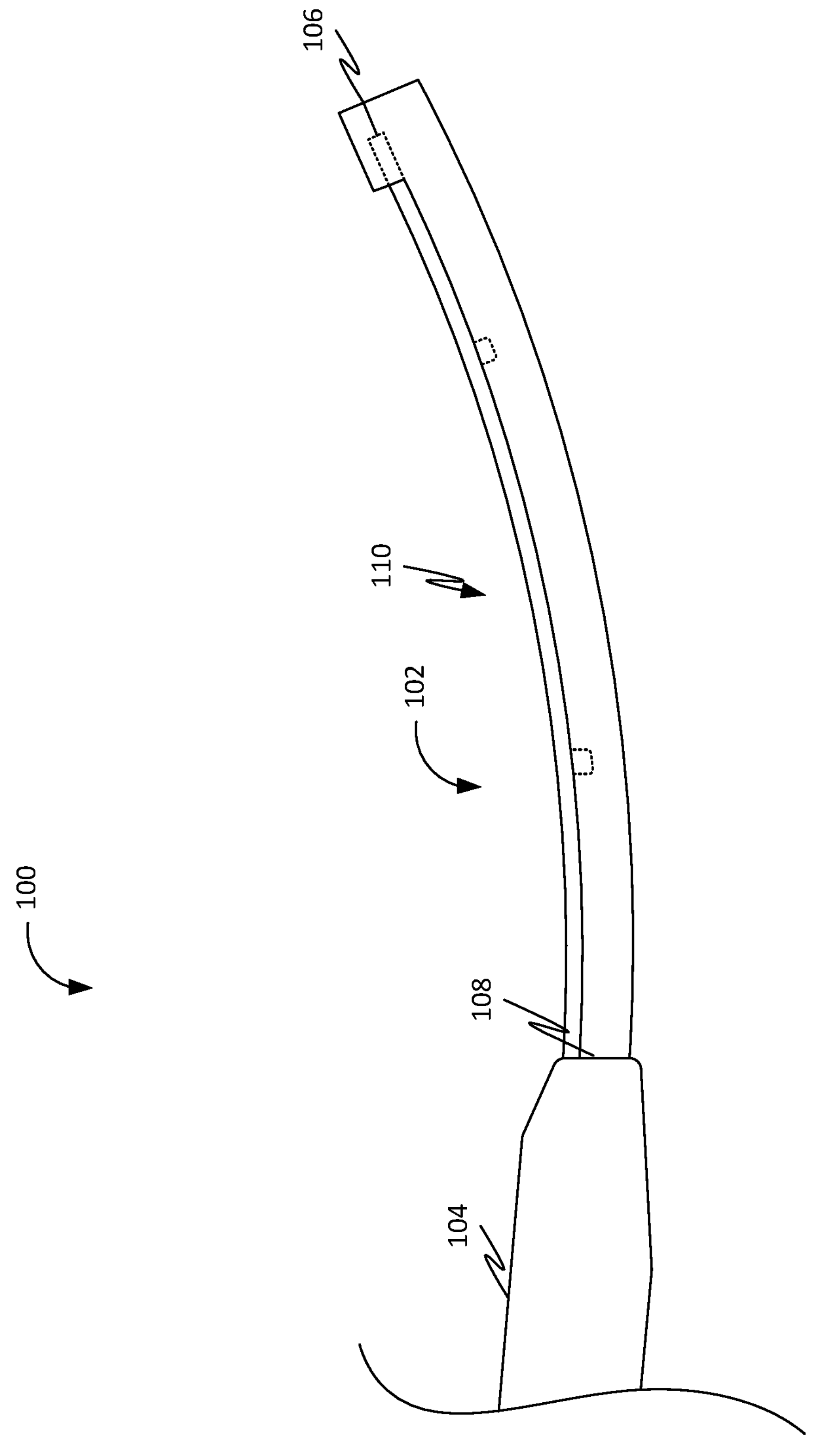
FIG. 8 is a top view of the shaving implement, in accordance with some embodiments.

FIG. 8 is a top view of the shaving implement 100, in accordance with some embodiments.

Figure 9:
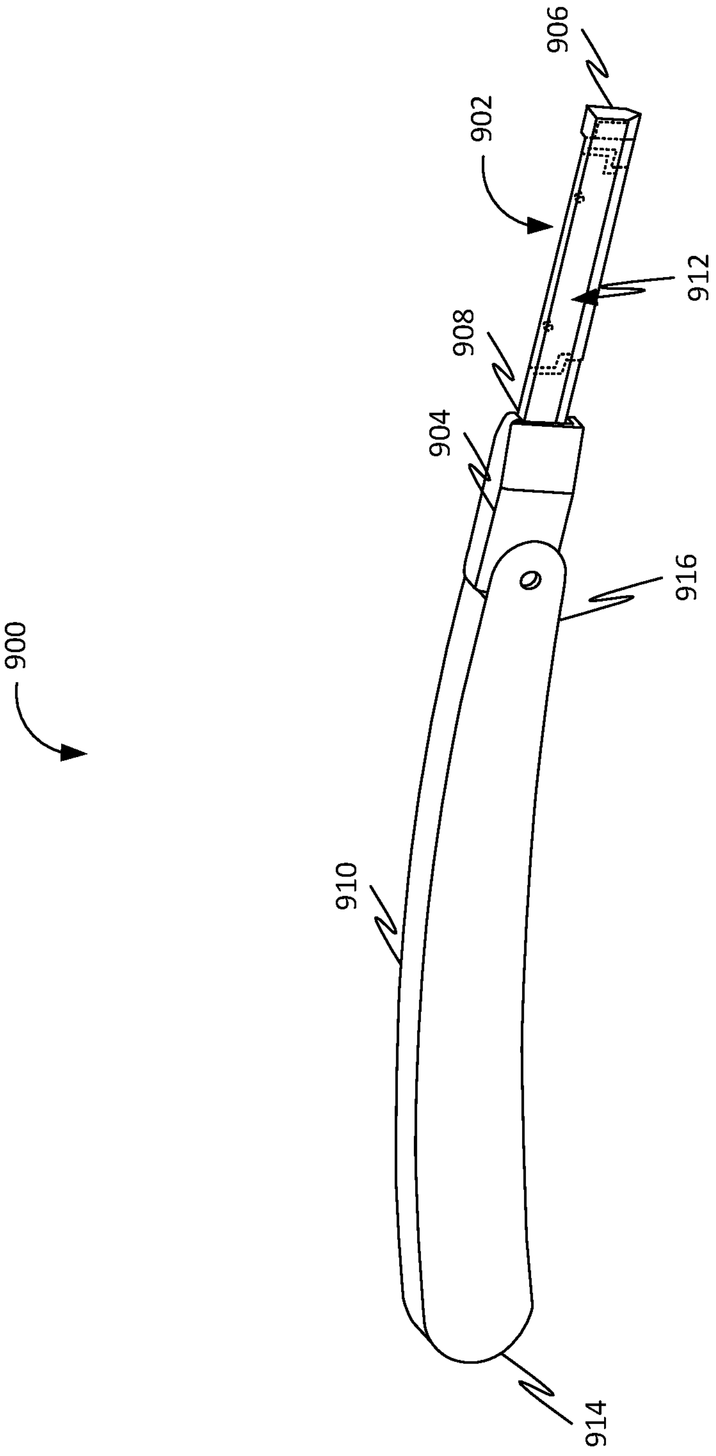
FIG. 9 is a perspective view of a shaving implement, in accordance with some embodiments.

FIG. 9 is a perspective view of a shaving implement 900, in accordance with some embodiments. Accordingly, the shaving implement 900 may include a cutting portion 902, an end portion 904, and a handle 910.

Figure 10:
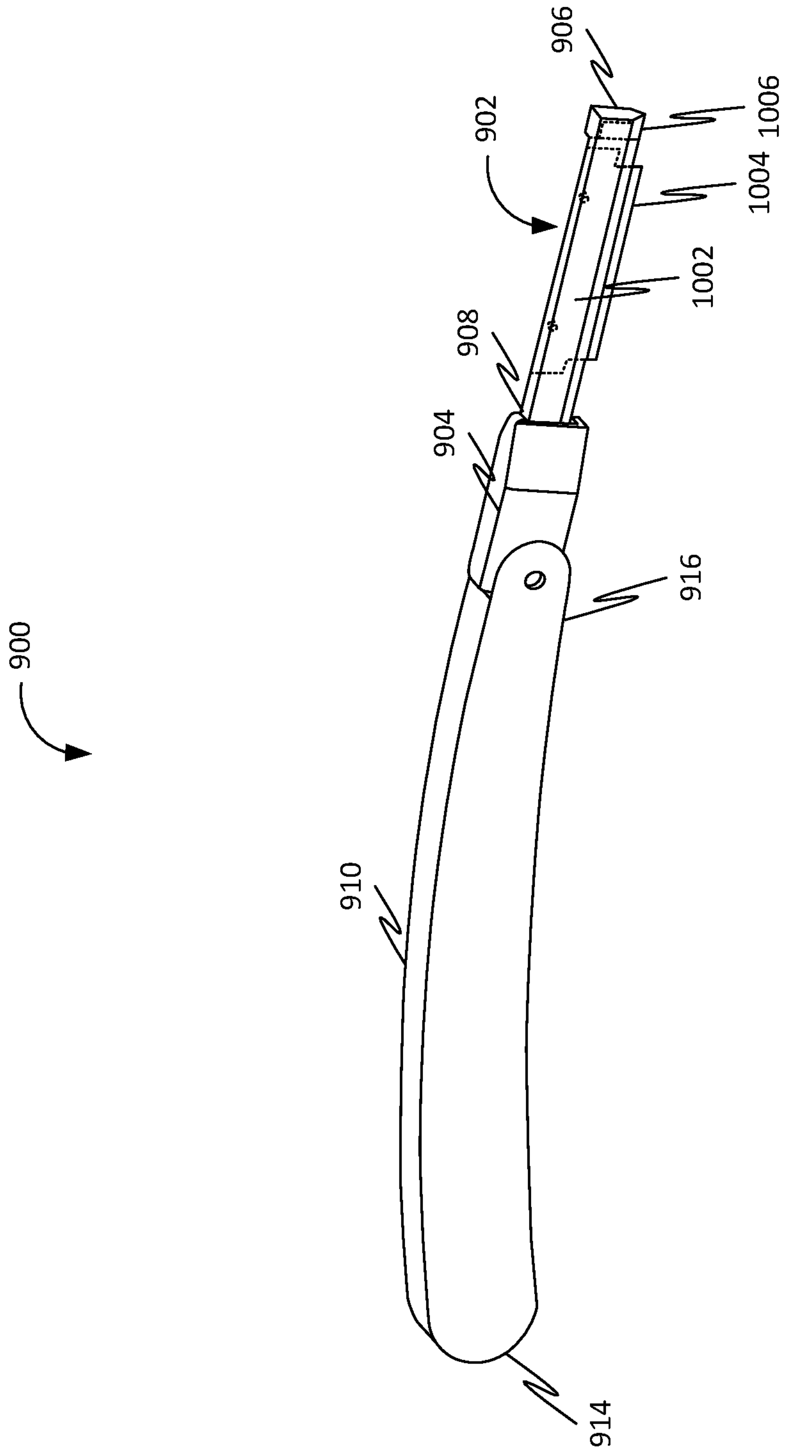
FIG. 10 is a perspective view of the shaving implement with the at least one blade, in accordance with some embodiments.

Further, the cutting portion 902 may include a first end 906 and a second end 908 opposite to the first end 906. Further, the cutting portion 902 may be configured to be transitioned between a straight configuration and at least one bent configuration based on an application of at least one external force on the cutting portion 902. Further, transitioning the cutting portion 902 from the straight configuration to the at least one bent configuration may include forming at least one bend in the cutting portion 902 along a length of the cutting portion 902 defined between the first end 906 and the second end 908. Further, the at least one bend may be characterized by at least one of a curvature and a direction of the at least one bend. Further, transitioning the cutting portion 902 from the at least one bent configuration to the straight configuration may include removing the at least one bend from the cutting portion 902. Further, the cutting portion 902 may be not transitionable between the straight configuration and the at least one bent configuration without the application of the at least one external force. Further, the cutting portion 902 may include at least one blade slot 912 configured for receiving at least one blade 1002, as shown in FIG. 10, in the at least one blade slot 912. Further, the cutting portion 902 may be configured for securing the at least one blade 1002 in the at least one blade slot 912. Further, a cutting edge 1004 of each of the at least one blade 1002 protrudes from a first side end 1006 of the cutting portion 902. Further, the first side end 1006 may be adjacent to the first end 906 and the second end 908. Further, the cutting portion 902 curves the at least one blade 1002 in at least one blade shape for conforming the at least one blade 1002 to the at least one bend based on the forming of the at least one bend.

Further, the end portion 904 may be configured for removably holding the cutting portion 902. Further, the second end 908 may be attached to the end portion 904 for the removably holding of the cutting portion 902.

Further, the handle 910 may be extending between a first handle end 914 and a second handle end 916. Further, the end portion 904 may be configured to be coupled with the handle 910 at the second handle end 916 for attaching the handle 910 to the cutting portion 902.

Further, in some embodiments, the cutting portion 902 may be comprised of at least one plastically deformable material. Further, the at least one plastically deformable material allows transitioning of the cutting portion 902 between the straight configuration and the at least one bent configuration based on the application of the at least one external force. Further, the at least one plastically deformable material does not allow the transitioning of the cutting portion 902 between the straight configuration and the at least one bent configuration without the application of the at least one external force.

Further, in some embodiments, the cutting portion 902 may be configured for removably securing the at least one blade 1002 in the at least one blade slot 912.

FIG. 10 is a perspective view of the shaving implement 900 with the at least one blade 1002, in accordance with some embodiments.

Although the present disclosure has been explained in relation to its preferred embodiment, it is to be understood that many other possible modifications and variations can be made without departing from the spirit and scope of the disclosure.

What is claimed is:

1. A shaving implement for facilitating shaving of facial hair, wherein the shaving implement comprises a cutting portion comprising a first end and a second end opposite to the first end, wherein the cutting portion is configured to be transitioned between a straight configuration and at least one bent configuration based on an application of at least one external force on the cutting portion, wherein the transitioning of the cutting portion from the straight configuration to the at least one bent configuration forms at least one bend in the cutting portion along a length of the cutting portion, wherein the forming of the at least one bend shapes the cutting portion in at least one shape, wherein the cutting portion retains the at least one shape after a removal of the at least one external force, wherein the cutting portion comprises a blade slot;

a single blade;

wherein the cutting portion is configured for receiving the single blade in the blade slot and securing the single blade in the blade slot, wherein, upon receiving and securing the single blade in the blade slot, the cutting portion is configured for bending the single blade in at least one blade shape for conforming the single blade to the at least one bend based on the forming of the at least one bend, wherein the shaving implement comprises only one blade, wherein the single blade does not operationally engage with any other blade to achieve the shaving of the facial hair using the shaving implement, wherein the single blade bent in the at least one blade shape is configured to fit a contour of a spot on a user's face, wherein a movement of the single blade, while in continuous contact with a skin of the user's face across the spot results in shaving of the facial hair.

2. The shaving implement of claim 1, wherein the single blade does not move in relation to any other blade to achieve the shaving of the facial hair.

3. The shaving implement of claim 1, wherein the single blade does not slidably engage with any other blade.

4. The shaving implement of claim 1, wherein the single blade is thin enough to be bent in the at least one blade shape by the cutting portion.

5. The shaving implement of claim 1, wherein the single blade is comprised of at least one material, wherein the at least one material is elastically deformable, wherein the at least one material is not plastically deformable.

6. The shaving implement of claim 5, wherein the at least one material of the single blade comprises at least one of steel and ceramic.

7. The shaving implement of claim 1, wherein the cutting portion is comprised of at least one shape memory material.

8. The shaving implement of claim 7, wherein the at least one shape memory material comprises nitinol.

9. The shaving implement of claim 1, wherein the shaving implement is not configured to comprise a plurality of blades.

10. A shaving implement for facilitating shaving of facial hair, wherein the shaving implement comprises a cutting portion comprising a first end and a second end opposite to the first end, wherein the cutting portion is configured to be transitioned between a straight configuration and at least one bent configuration based on an application of at least one external force on the cutting portion, wherein the transitioning of the cutting portion from the straight configuration to the at least one bent configuration forms at least one bend in the cutting portion along a length of the cutting portion, wherein the forming of the at least one bend shapes the cutting portion in at least one shape, wherein the cutting portion retains the at least one shape after a removal of the at least one external force, wherein the cutting portion comprises a blade slot;

a single blade;

wherein the cutting portion is configured for receiving the single blade in the blade slot and securing the single blade in the blade slot, wherein upon receiving and securing the single blade in the blade slot, the cutting portion is configured for bending the single blade in at least one blade shape for conforming the single blade to the at least one bend based on the forming of the at least one bend, wherein the shaving implement comprises only one blade, wherein the single blade does not operationally engage with any other blade to achieve the shaving of the facial hair using the shaving implement, wherein the single blade does not shearingly engage with any other blade, wherein the single blade bent in the at least one blade shape is configured to fit a contour of a spot on a user's face, wherein a movement of the single blade, while in continuous contact with a skin of the user's face across the spot results in shaving of the facial hair.

11. The shaving implement of claim 10, wherein the single blade does not move in relation to any other blade to achieve the shaving of the facial hair.

12. The shaving implement of claim 10, wherein the single blade is thin enough to be bent in the at least one blade shape by the cutting portion.

13. The shaving implement of claim 10, wherein the single blade is comprised of at least one material, wherein the at least one material is elastically deformable, wherein the at least one material is not plastically deformable.

14. The shaving implement of claim 13, wherein the at least one material of the single blade comprises at least one of steel and ceramic.

15. The shaving implement of claim 10, wherein the cutting portion is configured for removably receiving the single blade in the blade slot, wherein the single blade does not retain the at least one blade shape after removing the single blade from the blade slot.

16. The shaving implement of claim 10, wherein the cutting portion is comprised of at least one shape memory material.

17. The shaving implement of claim 16, wherein the at least one shape memory material comprises nitinol.

18. The shaving implement of claim 10, wherein the shaving implement is not configured to comprise a plurality of blades.

19. A shaving implement for facilitating shaving of facial hair, wherein the shaving implement comprises a cutting portion comprising a first end and a second end opposite to the first end, wherein the cutting portion is configured to be transitioned between a straight configuration and at least one bent configuration based on an application of at least one external force on the cutting portion, wherein the transitioning of the cutting portion from the straight configuration to the at least one bent configuration forms at least one bend in the cutting portion along a length of the cutting portion, wherein the forming of the at least one bend shapes the cutting portion in at least one shape, wherein the cutting portion retains the at least one shape after a removal of the at least one external force, wherein the cutting portion comprises a blade slot;

a single blade;

wherein the cutting portion is configured for receiving the single blade in the blade slot and securing the single blade in the blade slot, wherein upon receiving and securing the single blade in the blade slot, the cutting portion is configured for bending the single blade in at least one blade shape for conforming the single blade to the at least one bend based on the forming of the at least one bend, wherein the shaving implement comprises only one blade, wherein the single blade does not operationally engage with any other blade to achieve the shaving of the facial hair, wherein the single blade does not slidingly engage with any other blade, wherein the single blade is comprised of at least one material, wherein the at least one material is elastically deformable material, wherein the at least one material is not plastically deformable, wherein the cutting portion is configured for removably receiving the single blade in the blade slot, wherein the single blade does not retain the at least one blade shape after removing the single blade from the blade slot, wherein the single blade bent in the at least one blade shape is configured to fit a contour of a spot on a user's face, wherein a movement of the single blade, while in continuous contact with a skin of the user's face across the spot results in shaving of the facial hair.

* * * * *